United States Patent
Sakamoto et al.

(10) Patent No.: US 10,663,273 B2
(45) Date of Patent: May 26, 2020

(54) PROFILE MEASURING MACHINE AND MOVEMENT MECHANISM

(71) Applicant: MITUTOYO CORPORATION, Kanagawa (JP)

(72) Inventors: Masahiro Sakamoto, Tochigi (JP); Yoshikazu Ooyama, Tochigi (JP); Masato Takizawa, Tochigi (JP); Koji Takesako, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 215 days.

(21) Appl. No.: 15/859,924

(22) Filed: Jan. 2, 2018

(65) Prior Publication Data

US 2018/0195851 A1  Jul. 12, 2018

(30) Foreign Application Priority Data

Jan. 6, 2017  (JP) ................. 2017-001270

(51) Int. Cl.
*G01B 5/008* (2006.01)
*G01B 5/20* (2006.01)

(52) U.S. Cl.
CPC .............. *G01B 5/008* (2013.01); *G01B 5/20* (2013.01)

(58) Field of Classification Search
CPC .... G01B 5/008; G01B 21/047; G01B 5/0009; G01B 5/0014; G01B 5/012; G01B 21/042; G01B 3/205; G01B 5/20; G01B 7/001; G01B 11/005; G01B 11/24; G01B 21/04; G01B 3/008; G01B 5/0002; G01B 5/0016

USPC .......................................................... 33/503
See application file for complete search history.

(56) References Cited

U.S. PATENT DOCUMENTS

| | | | | |
|---|---|---|---|---|
| 4,882,847 A * | 11/1989 | Hemmelgarn | ......... | G01B 5/008 33/503 |
| 4,887,360 A * | 12/1989 | Hemmelgarn | ......... | G01B 5/008 33/503 |
| 4,928,396 A * | 5/1990 | Raleigh | .................. | B23Q 5/385 33/503 |
| 5,042,162 A * | 8/1991 | Helms | .................. | F16F 7/1005 248/559 |
| 5,848,480 A * | 12/1998 | Sola | ..................... | G01B 5/0004 33/573 |
| 6,161,298 A * | 12/2000 | Bernhardt | ........... | G01B 5/0014 33/503 |

(Continued)

FOREIGN PATENT DOCUMENTS

JP 2010-122118 A 6/2010
JP 2016-142542 A 8/2016

OTHER PUBLICATIONS

U.S. Appl. No. 15/906,558 to Yoshiharu Kimura et al., filed Feb. 27, 2018.

*Primary Examiner* — Yaritza Guadalupe-McCall
(74) *Attorney, Agent, or Firm* — Greenblum & Bernstein, P.L.C.

(57) ABSTRACT

A coordinate measuring machine includes: a table and a column which are configured to relatively move in a predetermined moving direction; a guide surface formed on the table and having a guide region and a drive region extending in the moving direction in parallel to each other; at least one air pad formed to the column and facing the guide region; and a drive roller formed to the column and rolling on the drive region.

5 Claims, 3 Drawing Sheets

(56) References Cited

U.S. PATENT DOCUMENTS

| | | | | |
|---|---|---|---|---|
| 6,643,944 B2* | 11/2003 | Yoda | ........................ | G01B 7/012 |
| | | | | 33/558 |
| 7,194,818 B2* | 3/2007 | Otsubo | ................ | G01B 21/047 |
| | | | | 33/502 |
| 8,984,876 B2 | 3/2015 | Fukuda et al. | | |
| 9,618,312 B2 | 4/2017 | Shimaoka et al. | | |
| 9,921,049 B2* | 3/2018 | Kanno | .................... | G01B 5/008 |
| 2002/0180470 A1* | 12/2002 | Yoda | ........................ | G01B 7/012 |
| | | | | 33/558 |
| 2004/0205974 A1* | 10/2004 | Ogura | .................. | G01B 5/0009 |
| | | | | 33/503 |
| 2014/0071460 A1* | 3/2014 | Suzuki | .................... | G01B 5/008 |
| | | | | 356/614 |
| 2014/0123509 A1* | 5/2014 | Furushima | ................ | G01B 7/28 |
| | | | | 33/503 |
| 2014/0317942 A1* | 10/2014 | Sagemueller | ......... | G01B 21/042 |
| | | | | 33/503 |
| 2017/0322016 A1* | 11/2017 | Kanno | .................... | G01B 5/008 |
| 2018/0149470 A1* | 5/2018 | Kanno | .................... | G01B 5/008 |
| 2018/0195851 A1* | 7/2018 | Sakamoto | ............... | G01B 5/008 |
| 2018/0252302 A1* | 9/2018 | Kimura | ................. | F16H 19/025 |
| 2018/0304276 A1* | 10/2018 | Hunter | ...................... | B03C 1/30 |
| 2018/0306570 A1* | 10/2018 | Angood | ................ | G01B 11/005 |
| 2019/0176863 A1* | 6/2019 | Sakuma | ................... | B62B 1/008 |

* cited by examiner

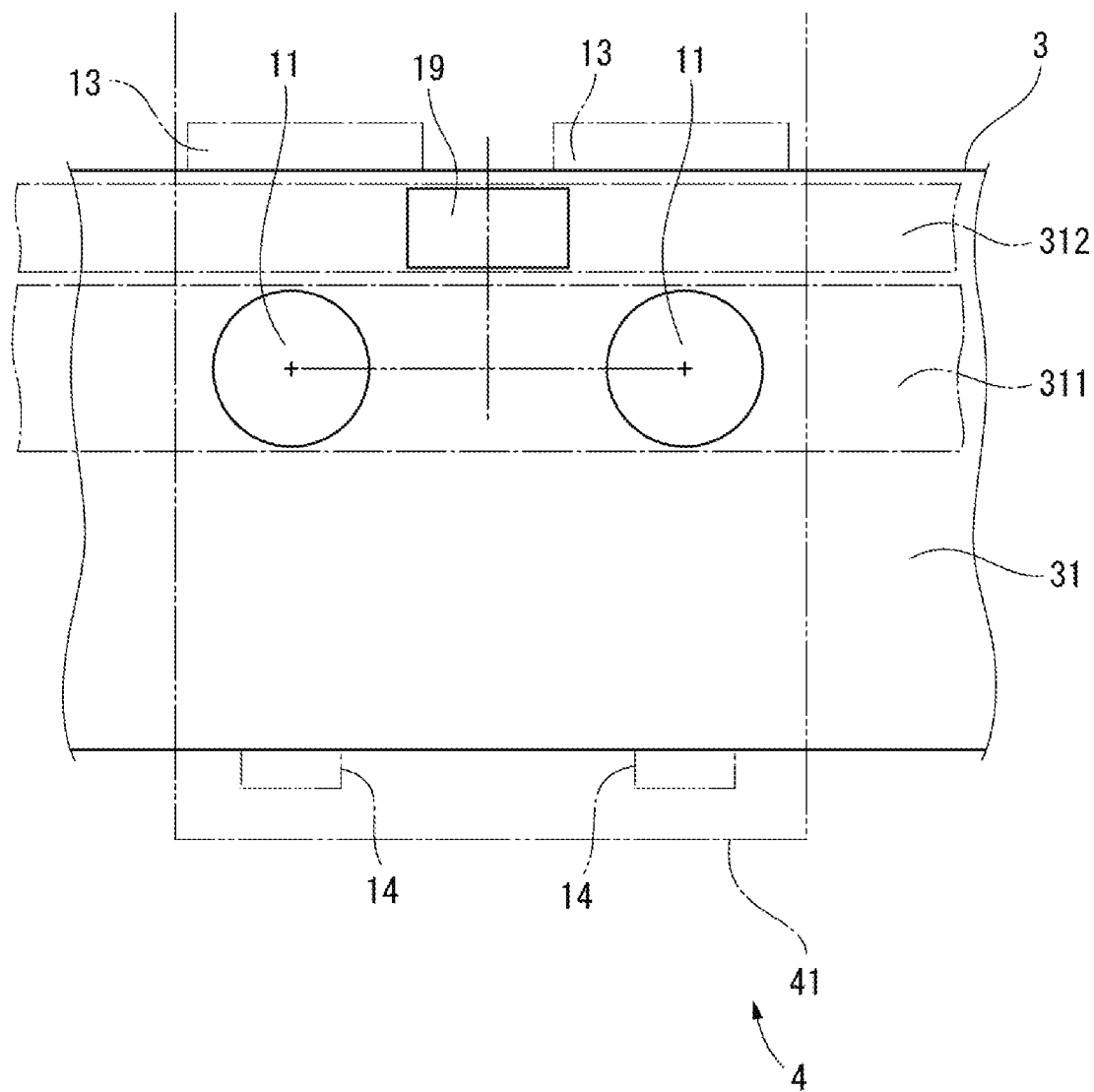

PROFILE MEASURING MACHINE AND MOVEMENT MECHANISM

The entire disclosure of Japanese Patent Application No. 2017-001270 filed Jan. 6, 2017 is expressly incorporated by reference herein.

TECHNICAL FIELD

The present invention relates to a profile measuring machine and a movement mechanism.

BACKGROUND ART

A coordinate measuring machine configured to move a probe in three dimensions with respect to a workpiece (measurement target) has been known as a profile measuring machine. A portal movement mechanism straddling the workpiece is used in a large-sized coordinate measuring machine (see Patent Literature 1: JP2010-122118A).

The portal coordinate measuring machine includes: a table on which the workpiece is placed; a pair of columns provided on both sides of the table; a beam bridging the pair of columns and extending in an X-axis direction; a slider capable of moving on and along the beam; a Z-spindle configured to be moved up and down relative to the slider; and a probe attached to a lower end of the Z-spindle. The columns and the beam are moved in a Y-axis direction relative to the table, the slider is moved along the beam in the X-axis direction, and the Z-spindle is moved in a Z-axis direction (up-down direction) relative to the slider, whereby the probe can be moved in three dimensions on the table relative to the workpiece. The respective movements in the X-axis, Y-axis and Z-axis directions are conducted by X-axis, Y-axis and Z-axis movement mechanism each in a form of a motor and the like.

In a typical movement mechanism configured to relatively move the table and the column in the Y-axis direction, for instance, a lateral surface of the table is defined as a guide surface and a roller is rolled on the guide surface (see Patent Literature 2: JP2016-142542A).

Specifically, highly flat guide surfaces are formed on both sides of an upper surface and lateral surfaces of the table. Air pads (static-pressure air bearings) are provided to the pair of columns in a manner to face the corresponding guide surfaces. Among the air pads, the air pads facing the upper surface of the table support loads of the corresponding columns. The columns are guided in the Y-axis direction by the air pads sandwiching both the lateral surfaces of the table.

A drive roller configured to roll on the lateral surface of the table is provided to one of the columns. Since the drive roller drives the one of the columns to move relative to the table, the entire portal structure, including the beam and the other column, are moved in the Y-axis direction relative to the table.

A friction-force-reinforcement material (e.g., urethane, rubber, and a silicon resin) having a thickness in the order of several mm is attached to a surface of the roller in order to reinforce a friction force applied on the table.

As described above, the region on which the drive roller rolls and the guide surface that the air pads face are provided to one of the lateral surfaces of the table.

In a typical arrangement as described in Patent Literature 2 and the like, the region of the drive roller and the guide surface overlap each other. Specifically, a pair of guiding air pads are provided to the column that is to be driven to move, and the drive roller is interposed between the pair of air pads and is configured to roll on the guide surface.

In this arrangement, the rolling of the roller sometimes causes the friction-force-reinforcement material on the roller surface to be worn into fine particles, resulting in adhesion of the fine particles to the guide surface.

The adhesion of the fine particles and the like to the guide surface impairs flatness and smoothness of the guide surface, which may hamper an appropriate static pressure floating of the air pads with a small interval, resulting in a loss of a desired guide function. However, if a hardness and a strength of the friction-force-reinforcement material are increased to avoid generation of the fine particles, the drive performance of the drive roller may fall below an appropriate level.

SUMMARY OF THE INVENTION

An object of the invention is to provide a profile measuring machine and a movement mechanism capable of appropriately obtaining a guide function of an air pad and a drive performance of a drive roller.

According to an aspect of the invention, a profile measuring machine includes: a first member and a second member configured to relatively move in a predetermined moving direction; a guide surface formed on the first member and including a guide region and a drive region extending in the moving direction in parallel to each other; at least one air pad formed on the second member and facing the guide region; and a drive roller formed on the second member and configured to roll on the drive region.

In the above aspect of the invention, the air pad facing the guide surface guides the second member relative to the first member. Then, the drive roller rolling on the guide surface drives the second member to move relative to the first member. In this movement, the air pad faces the guide region of the guide surface while the drive roller rolls on the drive region of the guide surface, the guide region and the drive region being parallel to each other and not overlapping with each other. Accordingly, even when fine particles of a friction-force-reinforcement material are generated by rolling of the drive roller, the fine particles solely adhere to the drive region, so that adhesion of the fine particles to the guide region is preventable. Consequently, flatness and smoothness of the guide region and the guide function of the air pad can be constantly maintained.

In the profile measuring machine with the above arrangement, preferably, the at least one air pad includes a plurality of air pads provided at different positions in the moving direction with respect to the guide region in common, and the drive roller is provided at a position facing the drive region and in the middle of the plurality of air pads in the moving direction.

Since the drive roller is pressed onto the drive region, the first member receives a pressing force from the second member. However, since the air pads provided on both sides of the drive roller in the moving direction prevent generation of unnecessary moment and the like, a posture of the second member can be maintained relative to the first member to keep a proper guide function in the moving direction.

In the profile measuring machine with the above arrangement, preferably, the first member is in a form of a table supporting a measurement target, and the guide surface is formed on a lateral surface of the table, and the second member is in a form of a column supporting the profile measuring machine, and the at least one air pad and the drive roller are respectively provided at parts of the column facing the guide surface.

The profile measuring machine according to the above aspect of the invention may be in a form of a coordinate measuring machine. The table and the column may be in a form of a table and a column of the coordinate measuring machine. For instance, the coordinate measuring machine includes: a cross beam supported by columns; a slider configured to be moved relative to the cross beam; and a Z-spindle configured to be moved up and down relative to the slider. The profile measuring machine according to the above aspect of the invention is applicable to a movement mechanism of each of the slider and the Z-spindle. In comparison, in the movement mechanism of the column and the table, when a portal structure including the column and the Z-spindle is determined as a movable structure, or when the portal structure is fixed and the table is determined as a movable structure, a mass of the movable structure is large, so that the driving force of the drive roller is the maximum. Since the larger driving force increases a generation frequency of fine particles, the profile measuring machine according to the above aspect of the invention is the most effective in the movement mechanism of the column and the table.

In the profile measuring machine with the above arrangement, the drive region is preferably formed upwardly adjacent to or above the guide region on the guide surface.

This arrangement determines the drive roller to be positioned above the air pads, so that the driving force generated from the drive roller can act near the centroid of the column and that of the structure including the column, resulting in a favorable moving accuracy. Although there is a possibility that the fine particles of the drive roller may fall onto the guide region from the drive region positioned above the guide region, the fine particles are not pressed onto the guide region by the drive roller but may be removed with air flowing over the guide region from the air pads. Thus, adhesion of the fine particles to the guide region is avoidable.

According to another aspect of the invention, a movement mechanism configured to relatively move a first member and a second member in a predetermined moving direction includes: a guide surface formed on the first member and including a guide region and a drive region extending in the moving direction in parallel to each other; at least one air pad formed on the second member and facing the guide region; and a drive roller formed on the second member and configured to roll on the drive region.

When the movement mechanism according to the above aspect of the invention is used in the profile measuring machine and the like including the first member and the second member relatively movable in a predetermined moving direction, the same advantages as described in relation to the above profile measuring machine can be obtained.

According to the above aspects of the invention, the profile measuring machine and the movement mechanism capable of inhibiting the fine particles generated by the rolling of the roller from adhering on the guide surface can be provided.

BRIEF DESCRIPTION OF DRAWING(S)

FIG. 3 is an enlarged lateral view showing the Y-axis driving portion according to the exemplary embodiment.

DESCRIPTION OF EMBODIMENT(S)

Exemplary embodiment(s) of the invention will be described below with reference to the attached drawings.

Figure 1:
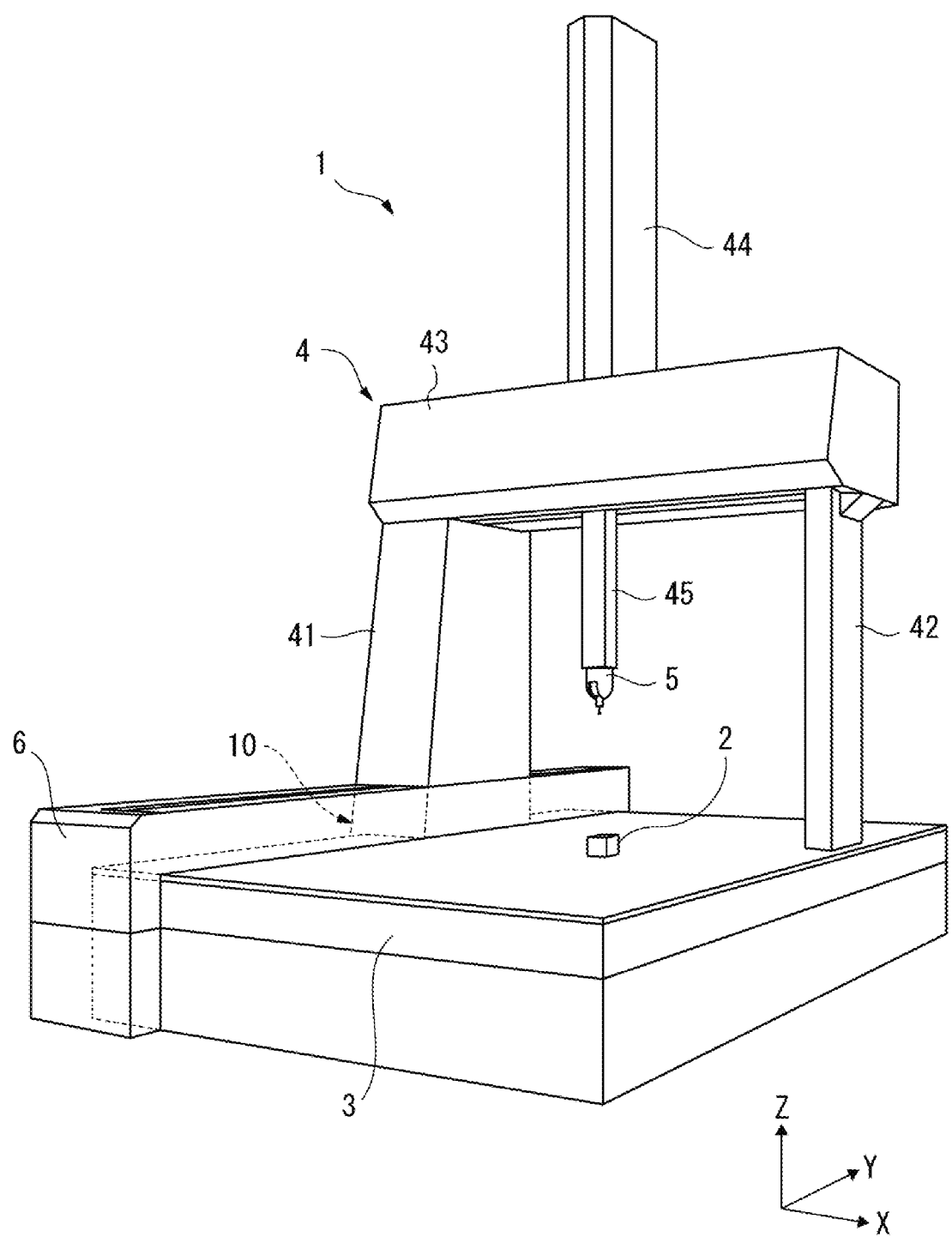
FIG. 1 is a perspective view showing a coordinate measuring machine according to an exemplary embodiment of the invention.

As shown in FIG. 1, a coordinate measuring machine 1, which is a profile measuring machine according to an exemplary embodiment of the invention, includes a table 3 on which a workpiece 2 is to be placed, and a portal structure 4 straddling the table 3. A measurement probe 5 is attached to the structure 4 and is movable by the structure 4 in three dimensions relative to the workpiece 2.

The portal structure 4 includes: a pair of columns 41, 42 provided to both sides of the table 3; a beam 43 bridging the columns 41, 42 and extending in an X-axis direction; and a slider 44 movable along the beam 43. A Z-spindle 45 is supported by the slider 44. A measurement probe 5 is attached to a lower end of the Z-spindle 45.

An X-axis movement mechanism (not shown) provided between the beam 43 and the slider 44, whereby the slider 44 is movable in the X-axis direction along the beam 43.

A Z-axis movement mechanism (not shown) is provided between the slider 44 and the Z-spindle 45, whereby the Z-spindle 45 is movable in the Z-axis direction relative to the slider 44.

A Y-axis movement mechanism 10 is provided between the table 3 and the columns 41, 42, whereby the portal structure 4 including the columns 41, 42 is movable in the Y-axis direction relative to the table 3.

The movements in the X, Y and Z axes directions allow the measurement probe 5 attached to the structure 4 to move in three dimensions relative to the workpiece 2 placed on the table 3.

The Y-axis movement mechanism 10 is configured to guide the structure 4 accurately in the Y-axis direction relative to the table 3 while enabling the table 3 to support a load of the structure 4, thereby driving the structure 4 to move in the Y-axis direction.

Herein, although the load of the structure 4 is supported in a shared manner by both of the columns 41, 42, the structure 4 is guided and driven in the Y-axis direction exclusively by the column 41.

A side of the table 3 close to the column 41 is covered with a casing 6 in order to protect the Y-axis movement mechanism 10 from dust and the like. An extendable cover is provided to an upper surface of the casing 6 so as not to hamper the Y-axis movement of the column 41.

Figure 2:
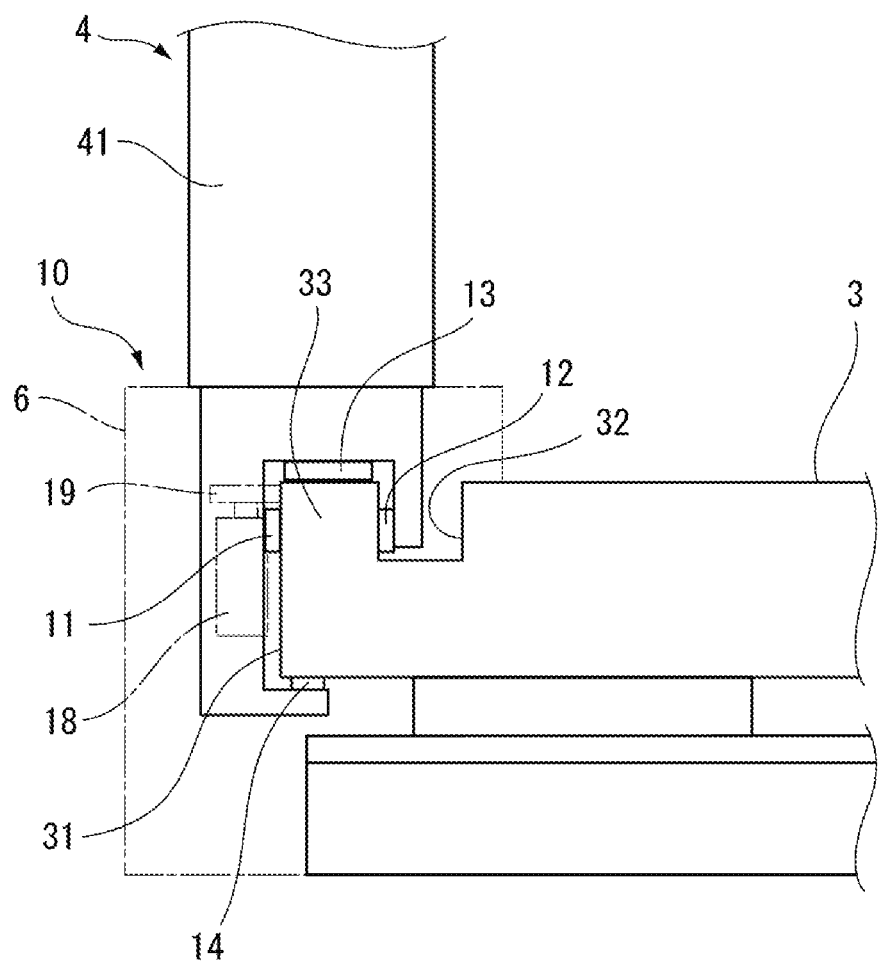
FIG. 2 is a front elevational view showing a Y-axis driving portion according to the exemplary embodiment.

As shown in FIG. 2, a guide surface 31 is formed on a lateral surface of the table 3 close to the column 41. A groove 32 is formed on the upper table 3 in a manner to extend along the lateral surface on which the guide surface 31 is formed, thereby defining a guide rail 33 between the groove 32 and the lateral surface.

Air pads 11, 12 facing each other in a horizontal direction and air pads 13, 14 facing each other in a vertical direction are provided to the column 41.

The air pad 11 faces the guide surface 31. The air pad 12 is provided in the groove 32 in a manner to face a lateral surface of the guide rail 33. The air pads 11, 12 horizontally sandwiches the guide rail 33.

The air pad 13 faces an upper surface of the guide rail 33. The air pad 14 faces a lower surface of the table 3 at a position beneath the guide rail 33.

Herein, the air pad 13 is set to have a load capacity necessary and sufficient for supporting the load of the structure 4. The air pad 14, which is relatively smaller the air pad 13, and the air pad 13 vertically sandwich the table 3.

The air pads 11 to 14 guide the structure 4 including the column 41 accurately in the Y-axis direction relative to the table 3.

Moreover, the air pad 13 can transmit the load of the column 41 to the table 3.

It should be noted that the same air pad as the air pad 13 of the column 41 is provided to a lower surface of the opposite column 42 and can transmit the load of the column 42 to the upper surface of the table 3.

A drive roller 19 is provided to a portion of the column 41 facing the guide surface 31.

The drive roller 19 is configured to roll on the guide surface 31 and be driven by a motor 18 to transmit a Y-axis directional driving force to the guide surface 31.

As shown in FIG. 3, two air pads 11 are provided at different positions of the column 41 in the Y-axis direction.

The air pads 11 face a guide region 311 of the guide surface 31 via a static pressure gap in the order of several tens µm.

The drive roller 19 is provided in the middle of the two air pads 11 in the Y-axis direction and is offset upward in a height direction from the air pads 11. A drive region 312 on which the drive roller 19 rolls is adjacent to an upper side of the guide region 311 and is parallel to the guide region 311. In other words, the guide region 311 and the drive region 312 are provided so as not to overlap with each other. It should be noted that a slight interval may be provided between the drive region 312 and the guide region 311.

A circumferential surface of the drive roller 19 is attached with a friction-force-reinforcement material (e.g., rubber) in order to reinforce a friction force to be generated between the circumferential surface of the drive roller 19 and the guide surface 31 over which the drive roller 19 rolls. The friction-force-reinforcement material may be coated over the circumferential surface of the drive roller 19. Alternatively, the drive roller 19 per se may be formed of the friction-force-reinforcement material.

In the exemplary embodiment, among the three-dimensional movements of the measurement probe 5 relative to the workpiece 2, the movement in the Y-axis direction of the measurement probe 5 relative to the workpiece 2 is conducted when the Y-axis movement mechanism 10 moves the structure 4 relative to the table 3.

In the Y-axis movement mechanism 10, the air pads 11 to 14 respectively facing four directions guide the column 41 (a second member) of the structure 4 relative to the table 3 (a first member). Rolling of the drive roller 19 over the guide surface 31 drives the column 41 to move relative to the table 3.

In this movement, the air pad 11 faces the guide region 311 of the guide surface 31 while the drive roller 19 rolls over the drive region 312 of the guide surface 31, the guide region 311 and the drive region 312 being parallel to each other and not overlapping with each other.

Accordingly, even when fine particles of the friction-force-reinforcement material are generated by rolling of the drive roller 19, the fine particles solely adhere to the drive region 312, so that adhesion of the fine particles to the guide region 311 is preventable. Consequently, flatness and smoothness of the guide region 311 and the guide function of the air pad 11 can be constantly maintained.

In the exemplary embodiment, the plurality of air pads 11 are provided at different positions in the moving direction relative to the common guide region 311, and the drive roller 19 is provided at the position facing the drive region 312 and in the middle of the air pads 11 in the moving direction.

Since the drive roller 19 is pressed onto the drive region 312, the table 3 receives a pressing force from the column 41. However, the air pads 11 provided on both sides of the drive roller 19 in the moving direction prevent generation of a moment and the like that causes torsion of the column 41, so that a posture of the column 41 can be maintained relative to the table 3 to keep a proper guide function in the moving direction.

In the exemplary embodiment, the Y-axis movement mechanism 10 is configured to move the portal structure 4 including the column 41 relative to the table 3, in which the movable structure has a large mass and the driving force of the drive roller 19 is the maximum to frequently generate fine particles. Accordingly, in the exemplary embodiment, adhesion of fine particles to the guide region 311 and damage to the air pads 11 due to the fine particle are most effectively prevented.

In the exemplary embodiment, the drive region 312 is formed above the guide region 311 on the guide surface 31. This arrangement determines the drive roller 19 to be positioned above the air pads 11, so that the driving force generated from the drive roller 19 can act near the centroid of the column 41 and that of the structure 4 including the column 41, resulting in a favorable moving accuracy. Although there is a possibility that the fine particles of the drive roller 19 may fall onto the guide region 311 from the drive region 312 positioned above the guide region 311, the fine particles are not pressed onto the guide region 311 by the drive roller 19 but may be removed with air flowing over the guide region 311 from the air pads 11. Thus, adhesion of the fine particles to the guide region 311 is avoidable.

It should be appreciated that the scope of the invention is not limited to the above exemplary embodiment but modifications and improvements that are compatible with an object of the invention are included within the scope of the invention.

In the above exemplary embodiment, the guide surface 31 is formed on the lateral surface of the table 3 and the guiding air pads 11 and the drive roller 19 are provided to the portions of the column 41 facing the guide surface 31. In another exemplary embodiment of the invention, the guide surface may be formed on an upper surface or a lower surface of the table 3, to which the air pad and the drive roller may be provided.

In the above exemplary embodiment, the two air pads 11 in line with the moving direction are used. However, three or more air pads may be used or a single air pad may be used alone. In the arrangement of three or more air pads, the drive roller 19 is preferably provided between two of the three or more air pads. In the arrangement of a single air pad, the air pad and the drive roller desirably correspond in position to each other in the moving direction.

In the above exemplary embodiment, the drive roller 19 is provided in the middle of the two air pads 11 in the moving direction and offset upward from the air pads 11. However, the drive roller 19 may be provided under the air pads 11. However, since the drive roller 19 becomes remote from the centroid of the structure 4, another countermeasure for keeping the accuracy may be required.

In the above exemplary embodiment, the invention is applied to the Y-axis movement mechanism 10 configured to move the column 41 (the second member) of the structure 4 in the Y-axis direction relative to the table 3 (the first member) in the coordinate measuring machine 1. However, the invention may be applied to an X-axis movement mechanism configured to move the slider 44 (the second member) along the beam 43 (the first member). Alternatively, the invention may be applied to a Z-axis movement mechanism configured to move the Z-spindle 45 (the second member) up and down relative to the slider 44 (the first member). Further alternatively, in a coordinate measuring machine including the portal structure 4 fixed to a foundation, in which the table 3 is movable in the Y-axis direction relative to the foundation, the invention may be applied to a movement mechanism provided between the table 3 and the foundation.

Still further alternatively, the invention may be applied to movement mechanisms of other profile measuring machines such as an image measuring machine configured to move a column (the second member) supporting a camera relative to the table (the first member) in addition to the coordinate measuring machine 1.

What is claimed is:

1. A profile measuring machine comprising:
   a first member and a second member configured to relatively move in a predetermined moving direction;
   a guide surface formed on the first member and comprising a guide region and a drive region extending in the moving direction in parallel to each other and without overlapping each other;
   at least one air pad formed on the second member and facing the guide region; and
   a drive roller formed on the second member and configured to roll on the drive region.

2. The profile measuring machine according to claim 1, wherein
   the at least one air pad comprises a plurality of air pads provided at different positions in the moving direction with respect to the guide region in common, and
   the drive roller is provided at a position facing the drive region and in the middle of the plurality of air pads in the moving direction.

3. The profile measuring machine according to claim 1, wherein
   the first member is in a form of a table supporting a measurement target, and the guide surface is formed on a lateral surface of the table, and
   the second member is in a form of a column supporting the profile measuring machine, and the at least one air pad and the drive roller are respectively provided at parts of the column facing the guide surface.

4. The profile measuring machine according to claim 1, wherein
   the drive region is formed upwardly adjacent to or above the guide region on the guide surface.

5. A movement mechanism configured to relatively move a first member and a second member in a predetermined moving direction, the movement mechanism comprising:
   a guide surface formed on the first member and comprising a guide region and a drive region extending in the moving direction in parallel to each other and without overlapping each other;
   at least one air pad formed on the second member and facing the guide region; and
   a drive roller formed on the second member and configured to roll on the drive region.

* * * * *